United States Patent
Nemoto et al.

(10) Patent No.: US 10,746,629 B2
(45) Date of Patent: Aug. 18, 2020

(54) INSPECTION DEVICE OF OPTICAL FIBER UNIT AND METHOD OF MANUFACTURING OPTICAL FIBER UNIT

(71) Applicant: FUJIKURA LTD., Tokyo (JP)

(72) Inventors: Yuki Nemoto, Sakura (JP); Shengyang Luo, Sakura (JP); Masanobu Higuchi, Sakura (JP); Tatsushi Ogasawara, Sakura (JP); Mizuki Isaji, Sakura (JP); Tomoaki Kaji, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/324,497

(22) PCT Filed: Aug. 7, 2017

(86) PCT No.: PCT/JP2017/028577
§ 371 (c)(1),
(2) Date: Feb. 8, 2019

(87) PCT Pub. No.: WO2018/034185
PCT Pub. Date: Feb. 22, 2018

(65) Prior Publication Data
US 2019/0339160 A1    Nov. 7, 2019

(30) Foreign Application Priority Data

Aug. 18, 2016  (JP) .................................. 2016-160563

(51) Int. Cl.
*G01M 11/08* (2006.01)
*G01B 11/02* (2006.01)
*G02B 6/44* (2006.01)

(52) U.S. Cl.
CPC ........... *G01M 11/088* (2013.01); *G01B 11/02* (2013.01); *G02B 6/44* (2013.01)

(58) Field of Classification Search
CPC ......... G01B 11/02; G02B 6/44; G01M 11/088
See application file for complete search history.

(56) References Cited

U.S. PATENT DOCUMENTS 3,982,816 A * 9/1976 Watkins ................. G01B 11/08
356/73.1
4,067,651 A * 1/1978 Watkins ................. G01B 11/08
250/550

(Continued)

FOREIGN PATENT DOCUMENTS

CN    2241889 Y    12/1996
CN    102692216 A    9/2012

(Continued)

OTHER PUBLICATIONS

Fujimoto et al. JP 2012088454, English Machine Translation (Year: 2012).*

(Continued)

*Primary Examiner* — Dominic J Bologna
(74) *Attorney, Agent, or Firm* — Osha Liang LLP

(57) ABSTRACT

An inspection device of an optical fiber unit, including a plurality of binding materials wound in an SZ shape on a plurality of optical fibers, includes: a measurement sensor that measures a width of the optical fiber units in a first direction orthogonal to a longitudinal direction in which the optical fiber unit extends; and a determination circuit that determines a presence or an absence of an abnormality in a binding state, based on a measurement result of the measurement sensor.

12 Claims, 5 Drawing Sheets

(56) References Cited

U.S. PATENT DOCUMENTS

| | | | | |
|---|---|---|---|---|
| 5,229,851 A | * | 7/1993 | Rahman | G02B 6/4403 385/112 |
| 5,229,854 A | * | 7/1993 | Wilber | H04N 5/10 348/529 |
| 5,309,221 A | * | 5/1994 | Fischer | G01M 11/37 356/496 |
| 5,410,401 A | * | 4/1995 | Shofner | D01G 31/003 356/634 |
| 2002/0126944 A1 | * | 9/2002 | Kim | G01L 1/242 385/15 |
| 2015/0049997 A1 | * | 2/2015 | Isaji | G02B 6/4403 385/114 |
| 2016/0223769 A1 | * | 8/2016 | Ito | G02B 6/4405 |
| 2017/0299815 A1 | * | 10/2017 | Sakamoto | G02B 6/30 |

FOREIGN PATENT DOCUMENTS

| | | |
|---|---|---|
| CN | 103018252 A | 4/2013 |
| JP | 2010-026196 A | 2/2010 |
| JP | 2011-169939 A | 9/2011 |
| JP | 2012-088454 A | 5/2012 |
| JP | 2013-088549 A | 5/2013 |
| JP | 2013-122544 A | 6/2013 |
| TW | 201514562 A | 4/2015 |

OTHER PUBLICATIONS

Notice of Reasons for Rejection issued in corresponding Japanese Application No. 2016-160563, dated May 23, 2017 (4 pages).

Notice of Allowance issued in corresponding Japanese Application No. 2016-160563, dated Sep. 5, 2017 (3 pages).

Office Action issued in corresponding Taiwanese Application No. 106127458, dated May 24, 2018 (3 pages).

Office Action issued in corresponding Chinese Application No. 201780049891.1 dated Jul. 8, 2019 (5 pages).

Klaus H. Bruns, "Drum twister for stranding of optical fibre cables"; Wire World International; vol. 29, No. 1; Dec. 31, 1986, pp. 13-16 (4 pages).

* cited by examiner

INSPECTION DEVICE OF OPTICAL FIBER UNIT AND METHOD OF MANUFACTURING OPTICAL FIBER UNIT

CROSS REFERENCE TO RELATED APPLICATIONS

This application is a national phase application of PCT Application No. PCT/JP2017/028577, filed on Aug. 7, 2017, which claims priority to Japanese Patent Application No. 2016-160563, filed on Aug. 18, 2016. The contents of the priority applications are incorporated by reference in their entirety.

TECHNICAL FIELD

The present invention relates to an inspection device of an optical fiber unit and a method of manufacturing an optical fiber unit.

BACKGROUND

In the related art, as disclosed in Patent Document 1, an optical fiber unit formed by winding binding materials on a plurality of optical fiber core wires or optical fiber strands (hereinafter, simply referred to as optical fibers). In the optical fiber unit, binding materials are wound, so it is possible to improve the discrimination between the plurality of optical fiber units depending on the colors of binding materials while suppressing the bundle of optical fiber core wires from becoming loose.

In addition, Patent Document 2 below proposes an optical fiber unit in which a plurality of binding materials are wound in an SZ shape on a bundle of optical fibers, and two binding materials are adhered to each other at the reversal point of the winding direction.

According to such configuration, when the portion at which the two binding materials are adhered to each other is peeled off, the binding around the peeled portion is released and the binding at the other portion is maintained. Thus, it is possible to improve workability of mid-span branching or the like of the optical fiber unit.

PRIOR ART DOCUMENTS

Patent Documents

[Patent Document 1] Japanese Unexamined Patent Application, First Publication No. 2010-26196

[Patent Document 2] Japanese Unexamined Patent Application, First Publication No. 2012-88454

When the binding materials are spirally wound on the bundle of optical fibers as in the configuration disclosed in Patent Document 1, the state of the wound binding materials is relatively stable.

On the other hand, in the case where the plurality of binding materials are wound in an SZ shape on the bundle of optical fibers as in the configuration disclosed in Patent Document 2, since the reversed portions of the plurality of binding materials are adhered to each other, there is a possibility that the plurality of binding materials are not properly adhered.

SUMMARY

Embodiments of the present invention provide an inspection device of an optical fiber unit and a method of manufacturing an optical fiber unit, which can detect when a plurality of binding materials are not properly adhered.

In an inspection device of an optical fiber unit according to one or more embodiments of the present invention, a plurality of binding materials are wound in an SZ shape on a plurality of optical fibers, and includes a measurement unit that is configured to measure a width of the optical fiber units in a first direction orthogonal to a longitudinal direction in which the optical fiber unit extends; and a determination unit that is configured to determine presence or absence of an abnormality in a binding state, according to a measurement result of the measurement unit.

According to one or more embodiments of the inspection device of an optical fiber unit, the measurement unit measures a width of the optical fiber unit in a first direction orthogonal to a longitudinal direction. In a case where the plurality of binding materials are not adhered properly, the width changes due to the collapse of the cross-sectional shape of the optical fiber unit. Therefore, since the determination unit determines presence or absence of an abnormality in a binding state, based on a measurement result of the width, it is possible to provide an inspection device of an optical fiber unit, capable of detecting presence or absence of an abnormality in a binding state with a simple configuration.

An inspection device of an optical fiber unit according to one or more embodiments of the present invention further includes a bending portion that is configured to bend the optical fiber unit, in which the bending portion includes an upper-side pressing portion disposed above the optical fiber unit, and a lower-side pressing portion disposed below the optical fiber unit, the upper-side pressing portion and the lower-side pressing portion are disposed at different positions in the longitudinal direction, and a distance between the upper-side pressing portion and the lower-side pressing portion in a second direction orthogonal to both the longitudinal direction and the first direction is smaller than a width of the optical fiber unit in the second direction.

In accordance with one or more embodiments, since the optical fiber unit is bent between the upper-side pressing portion and the lower-side pressing portion, the width of the optical fiber unit in the first direction changes more significantly, in cases where a plurality of binding materials are adhered properly and are not adhered properly. This makes it possible to more reliably detect an abnormality in the binding state.

In an inspection device of an optical fiber unit according to one or more embodiments of the present invention, a shortest distance between the upper-side pressing portion and the lower-side pressing portion is larger than an outer diameter of the optical fiber unit.

In accordance with one or more embodiments, it is possible to prevent the optical fiber from being compressed and damaged between the upper-side pressing portion and the lower-side pressing portion when the optical fiber unit is bent at the bending portion.

In an inspection device of an optical fiber unit according to one or more embodiments of the present invention, the bending portions are disposed on both sides interposing the measurement unit therebetween in the longitudinal direction, respectively.

In accordance with one or more embodiments, since the state in which the width of the optical fiber unit is greatly changed can be held before and after the measurement unit, with respect to the portion in which the plurality of binding materials are not properly adhered, it is possible to more reliably detect an abnormality in the binding state.

In an inspection device of an optical fiber unit according to one or more embodiments of the present invention, the measurement unit is further configured to measure a width of the optical fiber unit in the second direction orthogonal to both the longitudinal direction and the first direction.

In accordance with one or more embodiments, since the measurement unit measures the width of the optical fiber unit in the two directions orthogonal to the longitudinal direction, it is possible to more reliably detect the abnormality in the binding state.

In an inspection device of an optical fiber unit according to one or more embodiments of the present invention, the measurement unit is further configured to measure a position of the optical fiber unit in the longitudinal direction.

In accordance with one or more embodiments, since the measurement unit outputs the position in the longitudinal direction and the width in the first direction of the optical fiber unit in association with each other to the determination unit, it is possible to detect an abnormality in a binding state in real time with a simple configuration.

A manufacturing method of an optical fiber unit according one or more embodiments of the present invention includes a binding step of winding a plurality of binding materials in an SZ shape on a plurality of optical fibers to form an optical fiber unit; a measurement step of measuring a width of the optical fiber unit in a first direction orthogonal to a longitudinal direction in which the optical fiber unit extends; and a determination step of determining presence or absence of an abnormality in a binding state of the optical fiber unit, based on a measurement result in the measurement step.

In accordance with one or more embodiments, a width of the optical fiber unit in a first direction orthogonal to a longitudinal direction is measured in the measurement step. In a case where the plurality of binding materials is not adhered properly, the width changes due to the collapse of the cross-sectional shape of the optical fiber unit. Therefore, since the presence or absence of an abnormality in the binding state is determined based on the measurement result of the width in the determination step, it is possible to easily detect an abnormality in the binding state at the time of manufacturing the optical fiber unit.

A manufacturing method of an optical fiber unit according to one or more embodiments further includes a bending step of bending the optical fiber unit.

In accordance with one or more embodiments, since the optical fiber unit is bent, the width of the optical fiber unit in the first direction changes more significantly, in cases where a plurality of binding materials are adhered properly and are not adhered properly. This makes it possible to more reliably detect an abnormality in the binding state.

In a manufacturing method of an optical fiber unit according to one or more embodiments, in the determination step, presence or absence of an abnormality in a binding state of the optical fiber unit is determined for each binding pitch.

In accordance with one or more embodiments, when an abnormality in the binding state occurs, it is possible to promptly detect the abnormality. Furthermore, it is possible to easily specify a portion where the abnormality in the binding state occurs.

In a manufacturing method of an optical fiber unit according to one or more embodiments, in the determination step, of the optical fiber unit, a length in the longitudinal direction of a portion where the width of the optical fiber unit in the first direction exceeds an upper limit value is compared with a predetermined threshold value.

In accordance with one or more embodiments, when the width of the optical fiber unit in the first direction exceeds the upper limit value, the length in the longitudinal direction in which the state is continuous is compared with the threshold value, so the abnormality in the binding state can be determined. Thus, even in a case where the width measurement result temporarily exceeds the upper limit value due to electrical noise or the like, for example, if the state exceeds the threshold value and does not continue, it is not determined that there is an abnormality in the binding state. Therefore, erroneous detection of an abnormality in the binding state can be prevented.

A manufacturing method of an optical fiber unit according to one or more embodiments further includes an average value calculation step of calculating the average value of the width of the optical fiber unit in the first direction, in which in the determination step, the width of the optical fiber unit in the first direction is compared with the average value.

In accordance with one or more embodiments, since the abnormality in the binding state is determined by comparing the width of the optical fiber unit in the first direction with the average value, even if the thickness and the number of the optical fibers constituting the optical fiber unit are changed, it is possible to easily cope with this.

In a manufacturing method of an optical fiber unit according to one or more embodiments, in the measurement step, a position of the optical fiber unit in the longitudinal direction is further measured.

In accordance with one or more embodiments, since the position in the longitudinal direction and the width in the first direction of the optical fiber unit are measured in association with each other in the measurement step, it is possible to detect an abnormality in a binding state in real time with a simple configuration.

In accordance with one or more embodiments of the present invention, it is possible to provide an inspection device of an optical fiber unit and a method of manufacturing an optical fiber unit, which can detect erroneous boding in a case where a plurality of binding materials are not properly adhered.

DETAILED DESCRIPTION

Figure 1:
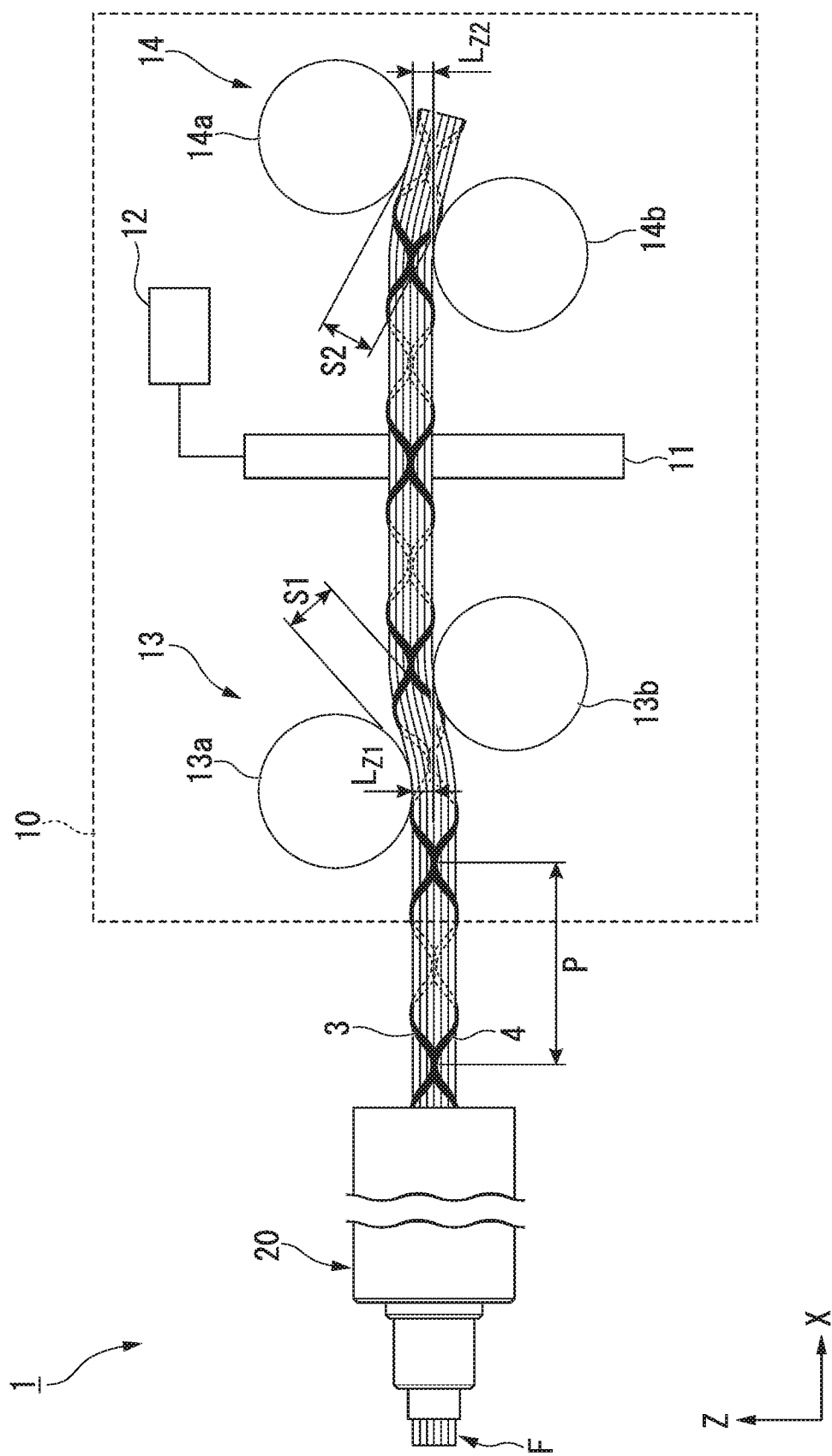
FIG. 1 is a schematic diagram showing a configuration of an optical fiber unit manufacturing apparatus including an inspection device of an optical fiber unit according to one or more embodiments.

Embodiments of the optical fiber unit manufacturing apparatus including the inspection device of an optical fiber unit will be described below with reference to FIGS. 1 to 5.

In the drawings used in the following description, in order to make the invention easier to understand, illustration of each component may be omitted, the scale may be changed, and the shape is simplified, in some cases.

As shown in FIG. 1, one or more embodiments of the optical fiber unit manufacturing apparatus (hereinafter, simply referred to as a manufacturing apparatus 1) include a binding device 20 and an inspection device of an optical fiber unit (hereinafter, simply referred to as an inspection device 10).

The binding device 20 is a device that forms an optical fiber unit by winding and binding a plurality of binding materials 3, 4 in an SZ shape on a plurality of optical fibers F. In other words, the optical fiber unit is formed by winding the plurality of binding materials 3, 4 in an SZ shape on the plurality of optical fibers F.

The inspection device 10 is a device of inspecting an abnormality in a binding state of the optical fiber unit.

Direction Definition

Here, according to one or more embodiments, the positional relationship of each configuration will be described by setting the XYZ orthogonal coordinate system. An X direction is the direction in which the optical fiber unit extends (hereinafter, referred to as a longitudinal direction). In the longitudinal direction, the side on which the binding device 20 is disposed is referred to as the upstream side, and the side on which the inspection device 10 is disposed is referred to as the downstream side. Further, a Z direction is referred to as a vertical direction, and a Y direction is referred to as a left-right direction. The left-right direction is orthogonal to the longitudinal direction. The vertical direction is orthogonal to both the longitudinal direction and the left-right direction.

Figure 2A:
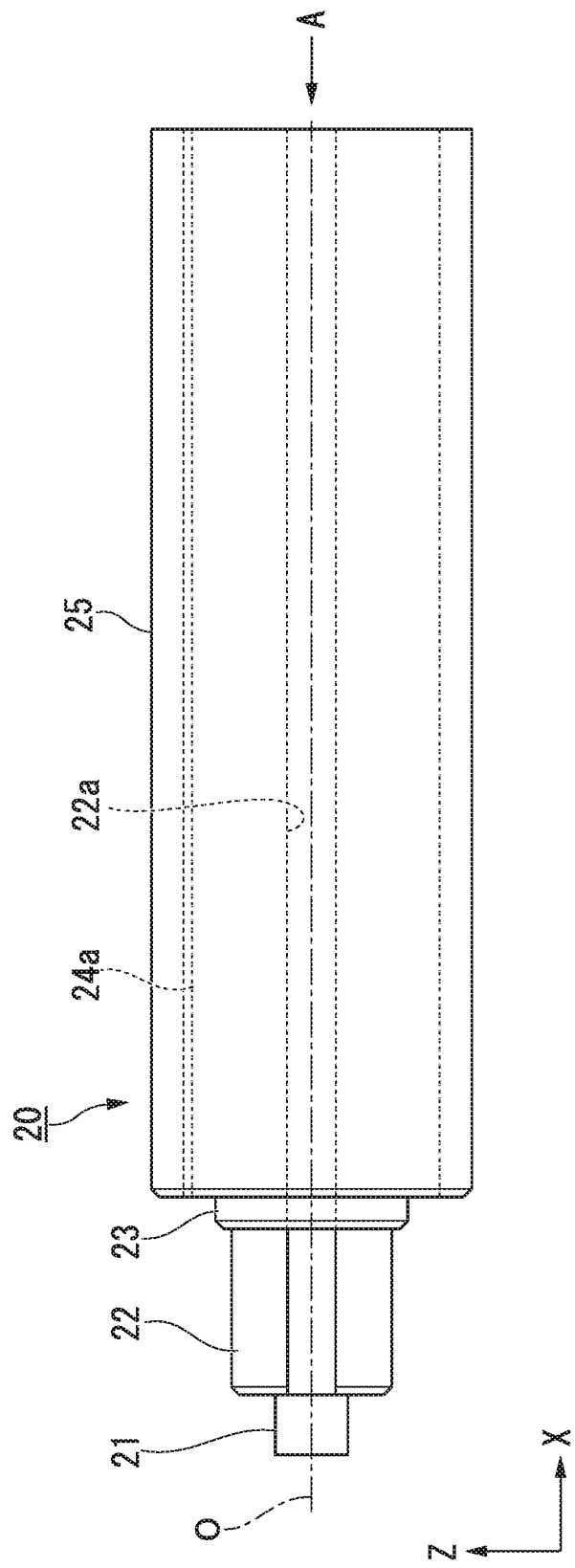
FIG. 2A is a side view of a binding device viewed in a left-right direction according to one or more embodiments.
Figure 2B:
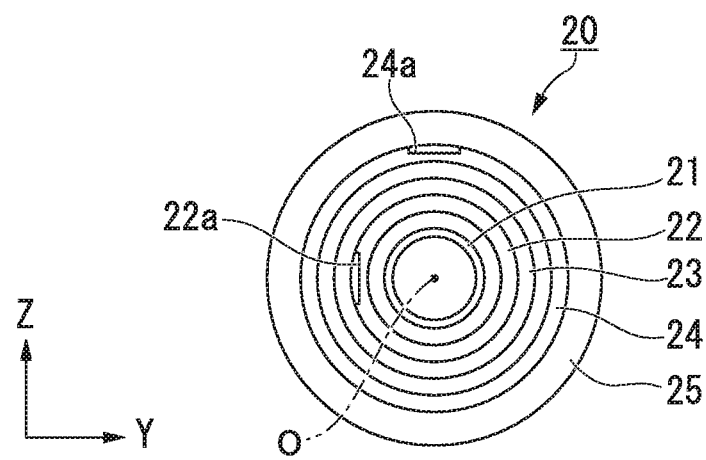
FIG. 2B is a view in a direction of arrow A in FIG. 2A.

FIG. 2A is a side view of the binding device 20 according to one or more embodiments as viewed from the left-right direction, and FIG. 2B is a view in the direction of arrow A in FIG. 2A.

As shown in FIGS. 2A and 2B, the binding device 20 is constituted by a plurality of cylindrical members. The binding device 20 includes a guide cylinder 21, a first inner cylinder 22, a first outer cylinder 23, a second inner cylinder 24, and a second outer cylinder 25 in order from the inside. These members are disposed in a state in which their central axes are located on a common central axis O. A plurality of optical fibers F are inserted into the guide cylinder 21.

The first inner cylinder 22 is fitted in the first outer cylinder 23 in a state of being rotatable around the central axis O with respect to the first outer cylinder 23. A groove 22a extending over the entire length in the longitudinal direction is formed on the outer peripheral surface of the first inner cylinder 22. The binding material 3 is inserted into the groove 22a.

The second inner cylinder 24 is fitted in the second outer cylinder 25 in a state of being rotatable around the central axis O with respect to the second outer cylinder 25. A groove 24a extending over the entire length in the longitudinal direction is formed on the outer peripheral surface of the second inner cylinder 24. The binding material 4 is inserted into the groove 24a.

The first inner cylinder 22 and the second inner cylinder 24 are connected to a common power source (not shown) and configured to rotate around the central axis O in association with the supply of power. When forming the optical fiber unit, as the plurality of optical fibers F pass through the guide cylinder 21 and are drawn out to the downstream side, the binding materials 3 and 4 in the grooves 22a and 24a are wound around the plurality of optical fibers F in an SZ shape. Since the binding materials 3 and 4 are heated and partially melted in the grooves 22a and 24a, the binding materials 3 and 4 are thermally fused to each other in the reversed portions of the SZ shape.

The binding materials 3 and 4 may not be heated in the grooves 22a and 24a but may be heated in a heating die (not shown) disposed downstream of the binding device 20. In this case, the binding materials 3 and 4 exit the binding device 20 in a state where the binding materials 3 and 4 are wound around the plurality of optical fibers F in the SZ shape, and then, are thermally fused to each other in the heating die.

As shown in FIG. 1, the inspection device 10 includes a measurement unit (measurement sensor) 11, a determination unit (determination circuit) 12, and bending portions (benders) 13 and 14. The measurement unit 11 is disposed on the downstream side of the binding device 20. The bending portions 13 and 14 are disposed on both sides of the measurement unit 11 in the longitudinal direction.

The measurement unit 11 measures the width W in the left-right direction and the width H in the vertical direction of the optical fiber unit. The measurement unit 11 may measure either the width W in the left-right direction or the width H in the vertical direction of the optical fiber unit.

As the measurement unit 11, for example, an optical external diameter measuring instrument, a linear gauge, an analog sensor, a fiber sensor, or the like can be used. The measurement unit 11 measures the widths of the optical fiber unit in the vertical direction and the left-right direction in association with the position of the optical fiber unit in the longitudinal direction, respectively. The measurement unit 11 outputs the measurement result to the determination unit 12.

The determination unit 12 is electrically connected to the measurement unit 11. Those of ordinary skill in the art would understand that the determination unit 12 may be implemented by various means, e.g., a circuit. The determination unit 12 determines the presence or absence of an abnormality in the binding state, based on the measurement results of the widths of the optical fiber unit in the vertical direction and the left-right direction by the measurement unit 11.

The bending portion 13 has an upper-side pressing portion (upper-side press) 13a and a lower-side pressing portion (lower-side press) 13b. The upper-side pressing portion 13a is disposed above the optical fiber unit and the lower-side pressing portion 13b is disposed below the optical fiber unit. The upper-side pressing portion 13a and the lower-side pressing portion 13b are disposed at different positions in the longitudinal direction, and the lower-side pressing portion 13b is disposed on the downstream side of the upper-side pressing portion 13a. In the longitudinal direction, the upper-side pressing portion 13a and the lower-side pressing portion 13b may be disposed to partly overlap with each other. The distance $L_{Z1}$ in the vertical direction between the upper-side pressing portion 13a and the lower-side pressing portion 13b is smaller than the width in the vertical direction of the optical fiber unit. The distance $L_{Z1}$ is the distance in the vertical direction between the lower end portion of the upper-side pressing portion 13a and the upper end portion of the lower-side pressing portion 13b. With this configuration, the optical fiber unit is bent upward when passing through the bending portion 13 to the downstream side. The shortest distance 51 between the upper-side pressing portion 13a and the lower-side pressing portion 13b is larger than the outer diameter of the optical fiber unit. The shortest distance 51 is a distance between the outer surface of the upper-side pressing portion 13a and the outer surface of the lower-side pressing portion 13b.

The bending portion 14 has an upper-side pressing portion 14a and a lower-side pressing portion 14b. The upper-side pressing portion 14a is disposed above the optical fiber unit and the lower-side pressing portion 14b is disposed below the optical fiber unit. The upper-side pressing portion 14a and the lower-side pressing portion 14b are disposed at different positions in the longitudinal direction, and the lower-side pressing portion 14b is disposed on the upstream side of the upper-side pressing portion 14a. In the longitudinal direction, the upper-side pressing portion 14a and the lower-side pressing portion 14b may be disposed to partly overlap with each other. The distance $L_{Z2}$ in the vertical direction between the upper-side pressing portion 14a and the lower-side pressing portion 14b is smaller than the width in the vertical direction of the optical fiber unit. The distance $Lz_2$ is the distance in the vertical direction between the lower end portion of the upper-side pressing portion 14a and the upper end portion of the lower-side pressing portion 14b. With this configuration, the optical fiber unit is bent downward when passing through the bending portion 14 to the downstream side. The shortest distance S2 between the upper-side pressing portion 14a and the lower-side pressing portion 14b is larger than the outer diameter of the optical fiber unit. The shortest distance S2 is a distance between the outer surface of the upper-side pressing portion 14a and the outer surface of the lower-side pressing portion 14b.

As the upper-side pressing portions 13a, 14a and the lower-side pressing portions 13b, 14b, for example, columnar rotating bodies (a pulley, a roller, or the like) extending in the left-right direction can be used. In this case, it is possible to reduce friction when the pressing portions 13, 14 bend the optical fiber unit.

Next, the operation of the manufacturing apparatus 1 configured as described above will be described.

In manufacturing the optical fiber unit, a binding step is first performed. In the binding step, the binding device 20 winds the binding materials 3, 4 on the plurality of optical fibers F in the SZ shape, and thermally fuses the reversed portions of the binding materials 3, 4. Thus, a plurality of optical fibers F are bound by the binding materials 3, 4, to form an optical fiber unit. The optical fiber unit formed in the binding step is drawn out to the downstream side of the binding device 20. In the binding step, an abnormality may occur in the binding state of the optical fiber unit. The abnormality in the binding state refers to a case where the binding materials 3 and 4 are not thermally fused and a case where a desired strength of thermal fusion is not obtained.

Next, a bending step is performed. In the bending step, the optical fiber unit is bent upward at the bending portion 13. According to one or more embodiments, the width in the left-right direction of the optical fiber unit in a case where the binding materials 3 and 4 are not thermally fused properly is defined as W2 (see FIGS. 3B and 4B). According to one or more embodiments, the width in the left-right direction when the binding materials 3 and 4 are thermally fused normally is defined as W1 (see FIGS. 3A and 4A). In a case where the abnormality in a binding state occurs, the binding materials 3 and 4 cannot maintain the shape of the optical fiber unit in the bending step, and the sectional shape of the optical fiber unit collapses. Thus, W2 is larger than W1 during the bending step.

Figure 3A:
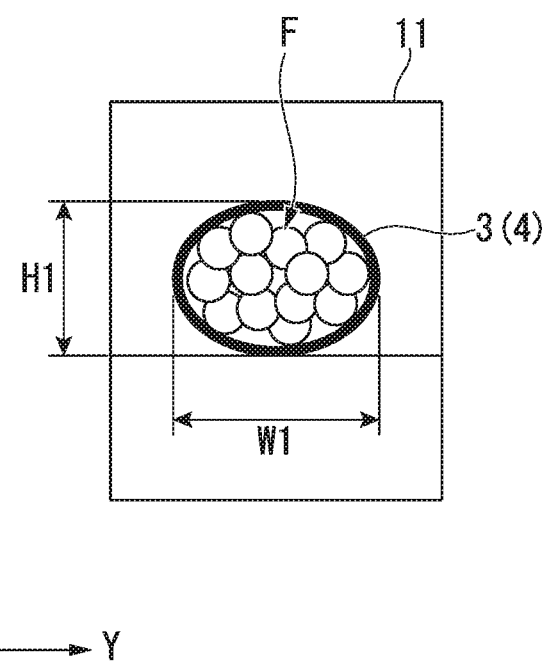
FIG. 3A is an explanatory diagram of the optical fiber unit in a normally bound state as viewed from a longitudinal direction according to one or more embodiments.
Figure 3B:
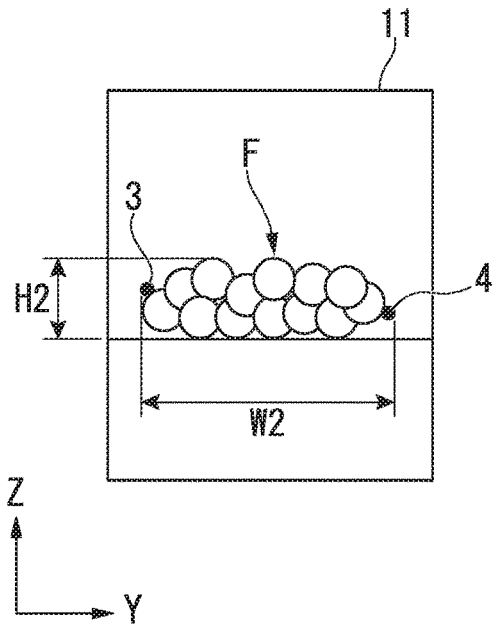
FIG. 3B is an explanatory diagram of an optical fiber unit in which an abnormality in a binding state occurs as viewed from the longitudinal direction according to one or more embodiments.

Similarly, the width in the vertical direction of the optical fiber unit in a case where the binding materials 3 and 4 are not thermally fused normally is defined as H2 (see FIG. 3B). Further, the width in the vertical direction when the binding materials 3 and 4 are thermally fused normally is defined as H1 (see FIG. 3A). In a case where the abnormality in a binding state is occurring, the binding materials 3 and 4 cannot maintain the shape of the optical fiber unit in the bending step, and the sectional shape collapses. Thus, H2 is smaller than H1 during the bending step.

In the case where the binding materials 3 and 4 are not thermally fused normally, the widths in the vertical and left-right directions change even if the optical fiber unit is not bent. However, according to one or more embodiments, the optical fiber unit is bent, so it is possible to make a change in a width more remarkable in a case where the binding materials 3 and 4 are not thermally fused normally. That is, by performing the bending step, the difference between H1 and H2 and the difference between W1 and W2 become large, and it is easy to determine the abnormality in the binding state.

Next, a measurement step is performed. In the measurement step, the measurement unit 11 measures the width H in the vertical direction and the width W in the left-right direction of the optical fiber unit.

Then, a determination step is performed. In the determination step, the determination unit 12 determines the presence or absence of an abnormality in a binding state of the optical fiber unit, based on the measurement result in the measurement step.

Figure 5:
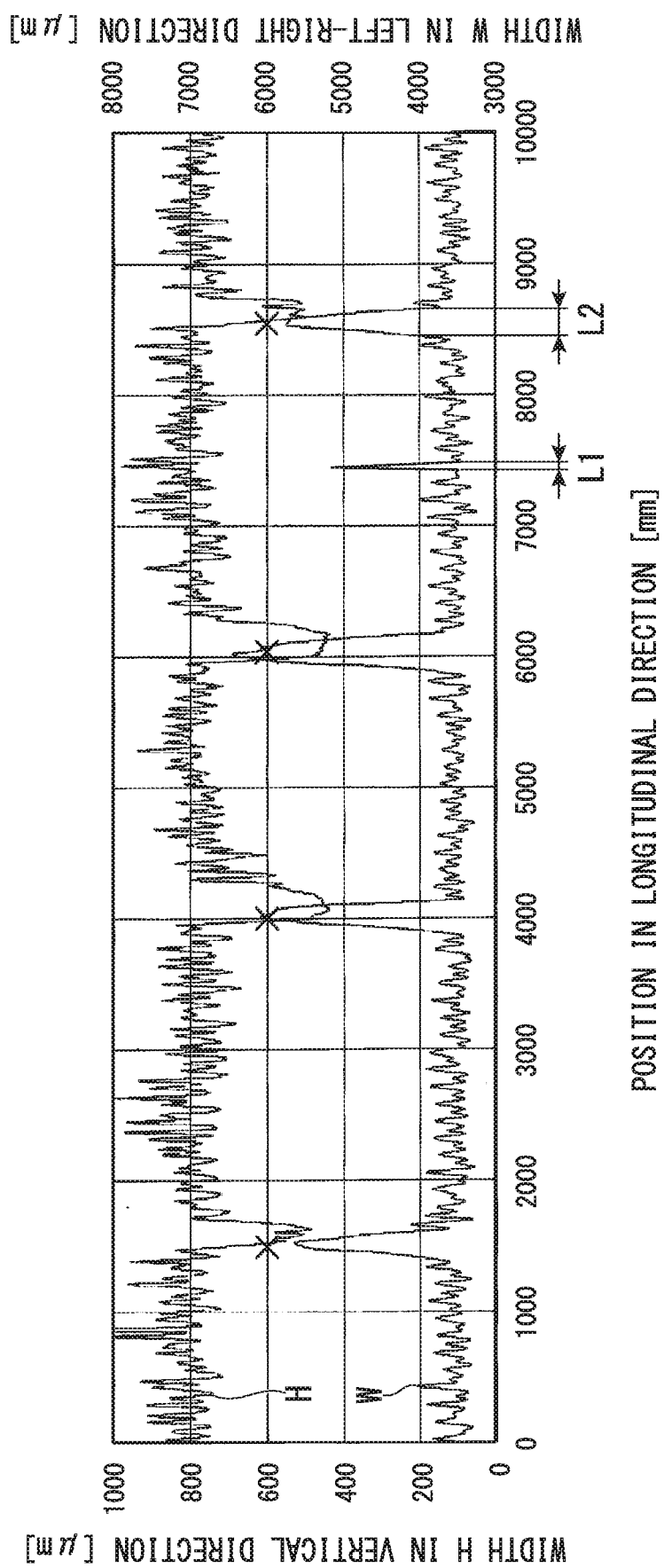
FIG. 5 is a graph showing a result of measuring a width of the optical fiber unit according to one or more embodiments.

FIG. 5 shows an example of the measurement result of the width of the optical fiber unit by the measurement unit 11 according to one or more embodiments. In FIG. 5, a horizontal axis represents the position in the longitudinal direction of the optical fiber unit, a first vertical axis represents the width H in the vertical direction of the optical fiber unit, and a second vertical axis represents the width W in the left-right direction of the optical fiber unit, respectively. In the example shown in FIG. 5, a 72-core optical fiber unit in which six pieces of 12-core intermittent adhesive tape core wires are bound is used. In addition, in the example shown in FIG. 5 according to one or more embodiments, in order to check the effectiveness of the inspection device 10, thermal fusion of the binding materials 3, 4 fails at positions indicated by X in FIG. 5.

As shown in FIG. 5, in the portions where the thermal fusion of the binding materials 3, 4 fails (X mark), the sectional shape of the optical fiber unit collapses, so the width H in the vertical direction of the optical fiber unit greatly decreases, and the width W in the left-right direction increases greatly.

Therefore, in one or more embodiments, the lower limit value with respect to the width H in the vertical direction is stored in the determination unit 12. The determination unit 12 compares the measured width H in the vertical direction and the lower limit value, and determines that an abnormality in the binding state is occurring in a case where the width H in the vertical direction falls below the lower limit value. Similarly, an upper limit value with respect to the width W in the left-right direction is stored in the determination unit 12. The determination unit 12 compares the measured width W in the left-right direction with the upper limit value, and determines that an abnormality in the binding state is occurring in a case where the width H in the left-right direction exceeds the upper limit value.

As described above, according to one or more embodiments of the inspection device 10, the measurement unit 11 measures the width H of the optical fiber unit in the vertical direction orthogonal to the longitudinal direction and the width W of the optical fiber unit in the left-right direction orthogonal to both the longitudinal direction and the vertical direction. In a case where the binding materials 3 and 4 are not thermally fused normally, the width H in the vertical direction and the width W in the left-right direction change. Therefore, since the determination unit 12 determines the presence or absence of an abnormality in a binding state, based on the measurement result of the width H or the width W, it is possible to detect presence or absence of an abnormality in a binding state with a simple configuration.

Further, in a case where the measurement unit 11 measures the width H in the vertical direction and the width W in the left-right direction of the optical fiber unit and the determination unit 12 determines the presence or absence of an abnormality in a binding state, based on the measurement result of the width H or the width W, it is possible to more reliably detect an abnormality in a binding state.

Further, the optical fiber unit is bent between the upper-side pressing portion 13*a* and the lower-side pressing portion 13*b*. Thus, in a case where the binding materials 3, 4 are thermally fused normally and in a case where the binding materials 3, 4 are not thermally fused normally, the width H in the vertical direction and the width W in the left-right direction of the optical fiber unit change more significantly. Therefore, it is possible to more reliably detect an abnormality in the binding state.

Further, the shortest distance 51 between the upper-side pressing portion 13*a* and the lower-side pressing portion 13*b* is larger than the outer diameter of the optical fiber unit. Therefore, it is possible to prevent the optical fiber F from being compressed and damaged between the upper-side pressing portion 13*a* and the lower-side pressing portion 13*b* when the optical fiber unit is bent at the bending portion 13.

Further, the bending portions 13, 14 are disposed on both sides sandwiching the measurement unit 11 in the longitudinal direction. Therefore, a state in which the width W and the width H of the portion where the binding materials 3, 4 are not thermally fused normally are changed largely with respect to the normally fused portion can be held before and after the measurement unit 11. This makes it possible to more reliably detect an abnormality in the binding state.

It should be noted that the technical scope of the present invention is not limited to the above-described embodiments, and various modifications can be made without departing from the spirit of the present invention.

For example, in one or more embodiments described above, the binding materials 3 and 4 are thermally fused to each other, but the present invention is not limited thereto. For example, the optical fiber unit may be formed by adhering the reversed portions of the binding materials 3, 4 with an adhesive.

Further, the determination unit 12 may determine the presence or absence of an abnormality in the binding state, for each pitch in the longitudinal direction in which the binding state of the binding materials 3, 4 is continuous (hereinafter simply referred to as a binding pitch P, see FIG. 1). In this case, in a case where an abnormality in the binding state occurs, the abnormality can be detected promptly and the portion where the abnormality in the binding state occurs can be easily specified.

Figure 4A:
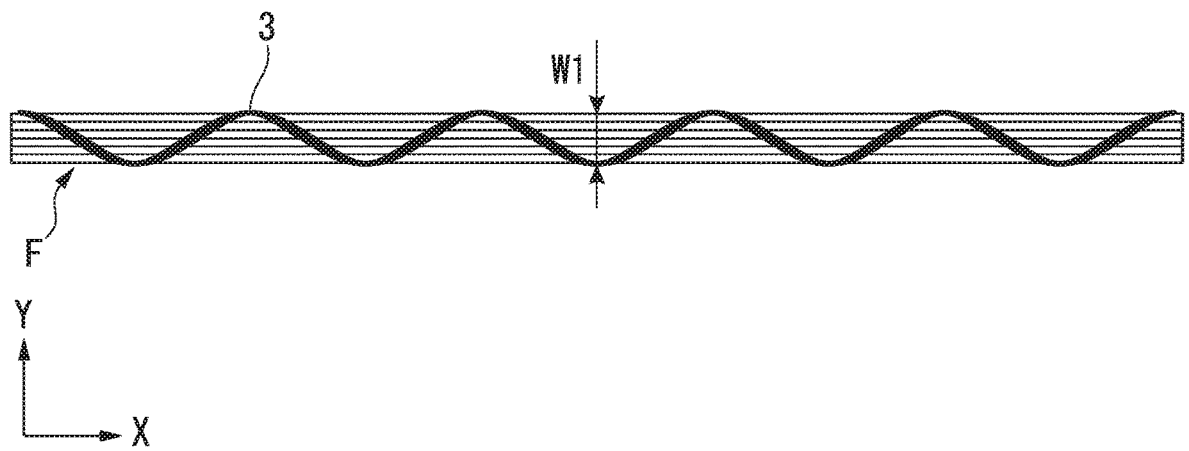
FIG. 4A is a top view of the optical fiber unit shown in FIG. 3A.
Figure 4B:
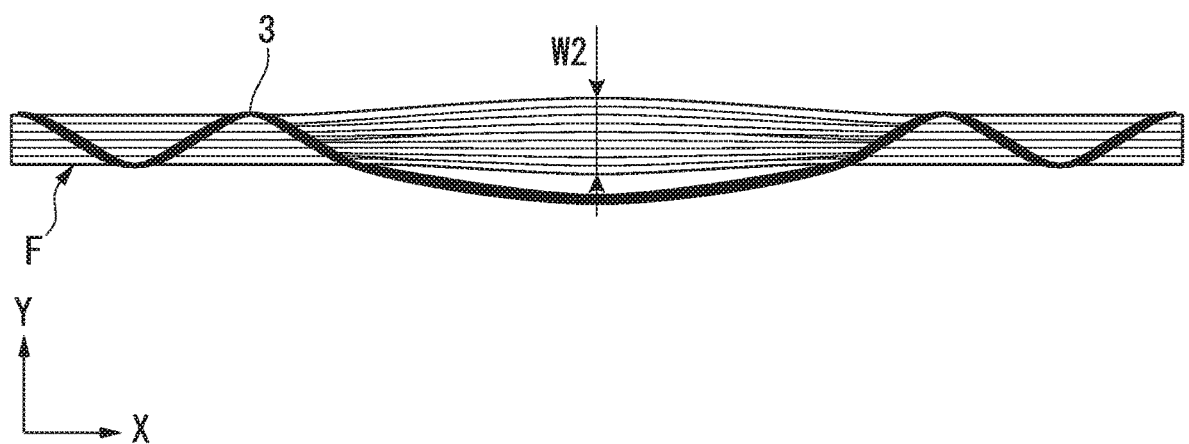
FIG. 4B is a top view of the optical fiber unit shown in FIG. 3B.

For example, in the example shown in FIG. 5, in a case where the upper limit value of the width W in the left-right direction is 4000 μm, there are several portions where the width W in the left-right direction exceeds the upper limit value in the range of 7000 to 9000 mm of position in the longitudinal direction. Among them, it is assumed that in the portion having the position in the longitudinal direction near 7500 mm, the length L1 in the longitudinal direction in a section where the width W in the left-right direction exceeds the upper limit value is small, which is a measurement result due to the electrical noise of the measurement unit 11, for example. On the other hand, in a case where an abnormality in the binding state actually occurs, as shown in FIG. 4B, a portion where the width W in the left-right direction is large has a certain length in the longitudinal direction. Therefore, in a case where an abnormality in the binding state occurs, as shown in a portion having the position in the longitudinal direction near 8500 mm in FIG. 5, the length L2 in the longitudinal direction in a section in where the width W in the left-right direction exceeds the upper limit value is enlarged to some extent.

As described above, the determination unit 12 may be configured to compare a predetermined threshold value with the length in the longitudinal direction of the portion of the optical fiber unit in which the width W in the left-right direction exceeds the upper limit value. In this case, for example, even in a case where the measurement result of the width W in the left-right direction temporarily exceeds the upper limit due to the electrical noise of the measurement unit 11 or the like, if the state does not continue beyond the threshold value, it is not determined that there is an abnormality in the binding state. Therefore, erroneous detection of an abnormality in the binding state can be prevented.

Similar to the above, the determination unit 12 may be configured to compare a predetermined threshold value with the length in the longitudinal direction of the portion of the optical fiber unit in which the width H in the vertical direction is lower than the lower limit value.

Further, the determination unit 12 may be configured to calculate a ratio of the length in the longitudinal direction of the portion of the optical fiber unit in which the width W in the left-right direction exceeds the upper limit value relative to the binding pitch P, and compare the ratio with a predetermined threshold value.

Similarly, the determination unit 12 may be configured to calculate a ratio of the length in the longitudinal direction of the portion of the optical fiber unit in which the width H in the vertical direction exceeds the lower limit value relative to the binding pitch P, and compare the ratio with a predetermined threshold value.

Further, the determination unit 12 may calculate the average value of the width W in the left-right direction or the width H in the vertical direction of the optical fiber unit (average value calculation step). Then, the average value may be compared with individual numerical values of the width W in the left-right direction or the width H in the vertical direction. In this case, for example, even if the thickness and the number of the optical fibers F constituting the optical fiber unit are changed, it is possible to easily cope with this.

Further, in one or more embodiments described above, the optical fiber unit is configured using two binding materials 3 and 4, but an optical fiber unit may be configured using three or more binding materials. Even in this case, the presence or absence of an abnormality in the binding state can be inspected by the inspection device 10 in accordance with one or more embodiments.

In one or more embodiments, the inspection device 10 includes the bending portions 13 and 14 that is configured to bend the optical fiber unit. However, the inspection device 10 not including such bending portions 13 and 14 may be adopted. For example, in the case where the tension in the longitudinal direction acting on the optical fiber unit is relatively small, even if the optical fiber unit is not bent by the bending portions 13, 14, the width of the optical fiber unit changes relatively largely in a case where an abnormality in the binding state occurs, so it is possible to inspect an abnormality in the binding state.

In one or more embodiments, the bending portions 13, 14 are disposed on both sides in the longitudinal direction of the inspection device 10, but the inspection device 10 including only one of the bending portions may be adopted.

In one or more embodiments, the measurement unit 11 measures the width H in the vertical direction and the width W in the left-right direction of the optical fiber unit, but the present invention is not limited thereto. For example, the measurement unit 11 that measures the width in either the vertical direction or the left-right direction may be adopted. That is, the left-right direction may be the first direction, and the vertical direction may be the first direction. Similarly, the left-right direction may be the second direction, and the vertical direction may be the second direction.

Alternatively, the measurement unit 11 measures the diameter of the maximum inscribed circle or the minimum circumscribed circle in a cross section orthogonal to the longitudinal direction of the optical fiber unit, and a determination unit 12 that determines the presence or absence of an abnormality in a binding state, based on the amount of variation in the longitudinal direction of these diameters may be adopted.

Further, the measurement unit 11 may further measure the position of the optical fiber unit in the longitudinal direction. Further, the measurement unit 11 may measure the position of the optical fiber unit in the longitudinal direction and the width H in the vertical direction or the width W in the left-right direction in association with each other, and output the measurement result to the determination unit 12. In this case, it is possible to acquire data as shown in FIG. 5 in real time with a simple configuration and detect an abnormality in the binding state.

Further, the inspection device 10 may be provided with a longitudinal position measurement unit that measures the position of the optical fiber unit in the longitudinal direction. In this case, the longitudinal position measurement unit may output data on the position of the optical fiber unit in the longitudinal direction to the determination unit 12 in synchronization with the data on the width H in the vertical direction and the width W in the left-right direction measured by the measurement unit 11.

FIG. 5 shows an example, according to one or more embodiments, of the measurement result of a 72-core optical fiber unit in which six pieces of 12-core intermittent adhesive tape core wires are bound. However, the present invention is not limited thereto, and can be applied to various types of optical fiber units.

For example, although not shown in the drawings, the same result as the graph shown in FIG. 5 is obtained for a 20-core unit using five pieces of 4-core intermittent adhesive tape core wires, an 80-core unit using ten pieces of 8-core intermittent adhesive tape core wires, a 144-core unit using twelve pieces of 12-core intermittent adhesive tape core wires, and a 288-core unit using twelve pieces of 24-core intermittent adhesive tape core wires.

Besides, without departing from the spirit of the present invention, it is possible to appropriately replace the constituent elements in the above-described embodiments with well-known constituent elements, and the above-described embodiments and modifications may be appropriately combined.

DESCRIPTION OF REFERENCE NUMERALS

1: optical fiber manufacturing apparatus
3, 4: binding material
10: inspection device
11: measurement unit
12: determination unit
13: front side bending portion
13a: upper-side pressing portion
13b: lower-side pressing portion
14: rear side bending portion
14a: upper-side pressing portion
14b: lower-side pressing portion
20: binding device
F: optical fiber Although the disclosure has been described with respect to only a limited number of embodiments, those skilled in the art, having benefit of this disclosure, will appreciate that various other embodiments may be devised without departing from the scope of the invention. Accordingly, the scope of the invention should only be limited by the attached claims.

The invention claimed is:

1. An inspection device of an optical fiber unit including a plurality of binding materials wound in an SZ shape on a plurality of optical fibers, the inspection device comprising:
    a measurement sensor that measures an overall width of the plurality of optical fibers in a first direction orthogonal to a longitudinal direction in which the optical fiber unit extends; and
    a determination circuit that determines a presence or an absence of a change in the overall width of the plurality of optical fibers in the first direction, based on a measurement result of the measurement sensor.

2. The inspection device according to claim 1, further comprising:
    a bender that bends the optical fiber unit,
    wherein the bender includes an upper-side press disposed above the optical fiber unit and a lower-side press disposed below the optical fiber unit,
    wherein the upper-side press and the lower-side press are disposed at different positions in the longitudinal direction, and
    wherein a distance between the upper-side press and the lower-side press in a second direction orthogonal to both the longitudinal direction and the first direction is smaller than an overall width of the plurality of optical fibers in the second direction.

3. The inspection device according to claim 2,
    wherein a shortest distance between the upper-side press and the lower-side press is larger than an outer diameter of the optical fiber unit.

4. The inspection device according to claim 2, further comprising:
    a second bender,
    wherein the two benders are disposed on both sides of the measurement sensor in the longitudinal direction such that the measurement sensor is interposed between the two benders.

5. The inspection device according to claim 1,
    wherein the measurement sensor measures an overall width of the plurality of optical fibers in a second direction orthogonal to both the longitudinal direction and the first direction.

6. The inspection device according to claim 1,
    wherein the measurement sensor measures a position of the optical fiber unit in the longitudinal direction.

7. A method of manufacturing an optical fiber unit including a plurality of binding materials wound in an SZ shape on a plurality of optical fibers, the method comprising:

measuring an overall width of the plurality of optical fibers in a first direction orthogonal to a longitudinal direction in which the optical fiber unit extends; and determining a presence or an absence of a change in the overall width of the plurality of optical fibers in the first direction, based on a measurement result.

8. The method according to claim 7, further comprising:
bending the optical fiber unit.

9. The method according to claim 7,
wherein the presence or the absence of the change in the overall width of the plurality of optical fibers in the first direction is determined for each binding pitch of the binding material.

10. The method according to claim 7,
wherein in determining the presence or the absence of the change in the overall width of the plurality of optical fibers in the first direction, a longitudinal length of a portion of the optical fiber unit, where the overall width of the plurality of optical fibers in the first direction exceeds an upper limit value, is compared with a predetermined threshold value.

11. The method according to claim 7, further comprising:
calculating an average value of the overall width of the plurality of optical fibers in the first direction,
wherein in determining the presence or the absence of the change in the overall width of the plurality of optical fibers, the overall width of the plurality of optical fibers in the first direction is compared with the average value.

12. The method according to claim 7, further comprising measuring a position of the optical fiber unit in the longitudinal direction.

* * * * *